US009832725B2

(12) United States Patent
Ponmudi et al.

(10) Patent No.: US 9,832,725 B2
(45) Date of Patent: *Nov. 28, 2017

(54) POWER SAVE MECHANISM FOR PEER-TO-PEER COMMUNICATION NETWORKS

(71) Applicant: QUALCOMM Incorporated, San Diego, CA (US)

(72) Inventors: Kayalvizhi Ponmudi, Tamilnadu (IN); Karthick Raja Chandrasekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,123

(22) Filed: May 29, 2015

(65) Prior Publication Data

US 2015/0264646 A1  Sep. 17, 2015

Related U.S. Application Data (63) Continuation of application No. 13/413,011, filed on Mar. 6, 2012, now Pat. No. 9,049,658.

(51) Int. Cl.
*G06F 1/00* (2006.01)
*H04W 52/02* (2009.01)
(Continued)

(52) U.S. Cl.
CPC ..... *H04W 52/0216* (2013.01); *H04L 67/1048* (2013.01); *H04W 52/0229* (2013.01); *H04W 76/023* (2013.01); *Y02B 60/50* (2013.01)

(58) Field of Classification Search
CPC .... G06F 1/3202; G06F 1/3289; G06F 1/3231; G06F 1/3228; G06F 1/26; G06F 1/206; G06F 1/266; H04L 12/10
See application file for complete search history.

(56) References Cited

U.S. PATENT DOCUMENTS 5,754,870 A  5/1998  Pollard
5,790,536 A  8/1998  Mahany
(Continued)

FOREIGN PATENT DOCUMENTS

CN  102017732  4/2011
EP  2157739  2/2010
(Continued)

OTHER PUBLICATIONS

"Japanese Patent Application No. 2015-177350, Office Action", Aug. 16, 2016, 4 pages.
(Continued)

*Primary Examiner* — Zahid Choudhury
(74) *Attorney, Agent, or Firm* — DeLizio Law, PLLC (57) ABSTRACT

A group owner of a peer-to-peer communication network is configured to determine whether all client devices associated with the peer-to-peer communication network support direct data communication. The group owner is configured to implement an awake mode for a portion of each beacon interval when all the associated client devices support direct data communication. The group owner is configured to implement a sleep mode for a remaining portion of each beacon interval to save power at the group owner without interrupting communications between the associated client devices.

30 Claims, 4 Drawing Sheets

(51) Int. Cl.
*H04L 29/08* (2006.01)
*H04W 76/02* (2009.01)

(56) References Cited

U.S. PATENT DOCUMENTS

| | | |
|---|---|---|
| 6,192,230 B1 | 2/2001 | Van Bokhorst et al. |
| 6,421,714 B1 | 7/2002 | Rai et al. |
| 6,570,857 B1 | 5/2003 | Haartsen et al. |
| 6,580,704 B1 | 6/2003 | Wellig et al. |
| 6,829,493 B1 | 12/2004 | Hunzinger |
| 6,836,472 B2 | 12/2004 | O'Toole et al. |
| 7,260,068 B2 | 8/2007 | Hsieh et al. |
| RE40,032 E | 1/2008 | Van Bokhorst et al. |
| 7,457,271 B2 | 11/2008 | Donovan |
| 7,457,973 B2 | 11/2008 | Liu |
| 7,505,795 B1 | 3/2009 | Lim et al. |
| 7,567,815 B2 | 7/2009 | Nishikawa et al. |
| 7,577,114 B2 | 8/2009 | Hsieh et al. |
| 7,634,275 B2 | 12/2009 | Odman |
| 7,751,356 B2 | 7/2010 | Kim et al. |
| 7,804,849 B2 | 9/2010 | Mahany et al. |
| 7,864,720 B2 | 1/2011 | Jeyaseelan |
| 7,881,755 B1 | 2/2011 | Mishra et al. |
| 7,916,663 B2 | 3/2011 | Yee |
| 7,978,638 B2 | 7/2011 | Kim et al. |
| 7,995,507 B2 | 8/2011 | Singh et al. |
| 8,045,494 B2 | 10/2011 | Habetha et al. |
| 8,064,474 B2 | 11/2011 | Lynch et al. |
| 8,072,913 B2 | 12/2011 | Desai |
| 8,089,964 B2 | 1/2012 | Lo et al. |
| 8,094,595 B2 | 1/2012 | Montojo et al. |
| 8,098,635 B2 | 1/2012 | Montojo et al. |
| 8,099,047 B2 | 1/2012 | David et al. |
| 8,112,650 B2 | 2/2012 | Qing et al. |
| 8,233,456 B1 | 7/2012 | Kopikare |
| 8,233,462 B2 | 7/2012 | Walton et al. |
| 8,326,372 B2 | 12/2012 | Raissinia |
| 8,526,346 B1 | 9/2013 | Liu |
| 8,537,733 B1 | 9/2013 | Panneerselvam et al. |
| 8,576,761 B1 | 11/2013 | Pitchaiah |
| 8,588,156 B1 | 11/2013 | Liu |
| 8,611,268 B1 | 12/2013 | Thandaveswaran |
| 8,744,496 B2 | 6/2014 | Cave et al. |
| 8,755,313 B2 | 6/2014 | Damnjanovic et al. |
| 8,966,001 B2 | 2/2015 | Rauber et al. |
| 2001/0031626 A1 | 10/2001 | Lindskog et al. |
| 2002/0045435 A1 | 4/2002 | Fantaske |
| 2002/0164963 A1 | 11/2002 | Tehrani et al. |
| 2004/0085972 A1 | 5/2004 | Warren et al. |
| 2004/0190467 A1 | 9/2004 | Liu et al. |
| 2004/0259542 A1 | 12/2004 | Viitamaki et al. |
| 2005/0135284 A1 | 6/2005 | Nanda et al. |
| 2005/0136914 A1 | 6/2005 | Van Kampen et al. |
| 2005/0152324 A1 | 7/2005 | Benveniste |
| 2005/0286454 A1 | 12/2005 | Morimoto et al. |
| 2006/0029024 A1 | 2/2006 | Zeng et al. |
| 2006/0292987 A1 | 12/2006 | Ophir et al. |
| 2007/0057767 A1 | 3/2007 | Sun et al. |
| 2007/0077936 A1 | 4/2007 | Tomisawa et al. |
| 2007/0082688 A1 | 4/2007 | Tu et al. |
| 2007/0171910 A1 | 7/2007 | Kumar |
| 2007/0183393 A1 | 8/2007 | Boyd et al. |
| 2007/0230393 A1 | 10/2007 | Sinha et al. |
| 2007/0248066 A1 | 10/2007 | Banerjea et al. |
| 2008/0069021 A1 | 3/2008 | Chhabra |
| 2008/0095134 A1 | 4/2008 | Chen et al. |
| 2009/0016248 A1 | 1/2009 | Li et al. |
| 2009/0034443 A1 | 2/2009 | Walker et al. |
| 2009/0073945 A1 | 3/2009 | Seok |
| 2009/0097438 A1 | 4/2009 | Kneckt et al. |
| 2009/0196211 A1 | 8/2009 | Wentink |
| 2009/0279467 A1 | 11/2009 | Ji |
| 2009/0296615 A1 | 12/2009 | Kim et al. |
| 2009/0310578 A1 | 12/2009 | Convertino et al. |
| 2009/0312073 A1 | 12/2009 | Park et al. |
| 2010/0061272 A1 | 3/2010 | Veillette |
| 2010/0070767 A1 | 3/2010 | Walker et al. |
| 2010/0093378 A1 | 4/2010 | Chin et al. |
| 2010/0118797 A1 | 5/2010 | Park |
| 2010/0128701 A1 | 5/2010 | Nagaraja |
| 2010/0153727 A1 | 6/2010 | Reznik et al. |
| 2010/0189021 A1 | 7/2010 | He et al. |
| 2010/0214968 A1 | 8/2010 | Paliwal et al. |
| 2010/0246591 A1 | 9/2010 | Gobriel et al. |
| 2010/0254290 A1 | 10/2010 | Gong et al. |
| 2010/0284316 A1 | 11/2010 | Sampathkumar |
| 2010/0304780 A1 | 12/2010 | Chung et al. |
| 2010/0325459 A1 | 12/2010 | Kangude et al. |
| 2011/0051638 A1 | 3/2011 | Jeon et al. |
| 2011/0086662 A1 | 4/2011 | Fong et al. |
| 2011/0122835 A1 | 5/2011 | Naito et al. |
| 2011/0158142 A1 | 6/2011 | Gong et al. |
| 2011/0161697 A1 | 6/2011 | Qi et al. |
| 2011/0237294 A1 | 9/2011 | Hussain |
| 2011/0280170 A1 | 11/2011 | Bowser et al. |
| 2012/0021735 A1 | 1/2012 | Maeder et al. |
| 2012/0151089 A1* | 6/2012 | Ponmudi ............ H04W 76/023 709/237 |
| 2013/0028156 A1* | 1/2013 | Vedantham ....... H04W 52/0229 370/311 |
| 2013/0028206 A1 | 1/2013 | Cho et al. |
| 2013/0201936 A1 | 8/2013 | Chen et al. |
| 2013/0204936 A1 | 8/2013 | El Khayat et al. |
| 2013/0238919 A1 | 9/2013 | Ponmudi et al. |
| 2013/0329618 A1 | 12/2013 | Panneerselvam et al. |
| 2014/0237156 A1 | 8/2014 | Regula et al. |
| 2014/0269692 A1 | 9/2014 | Flynn et al. |

FOREIGN PATENT DOCUMENTS

| | | |
|---|---|---|
| JP | 2010028168 | 2/2010 |
| JP | 2011010121 | 1/2011 |
| JP | 2012529821 | 11/2012 |
| WO | 2008149598 | 11/2008 |
| WO | 2009062116 | 5/2009 |
| WO | 2010027925 | 3/2010 |

OTHER PUBLICATIONS

"IEEE Standard for Information Technology—Telecommunications and information exchange between systems—Local and metropolitan area networks—Specific requirements—Part 11: Wireless LAN Medium Access Control (MAC) and Physical Layer (PHY) Specification", IEEE Std 802:11-2007 (Revision of IEEE Std 802.11-1999), Jun. 12, 2007, 254 pages.
"IEEE Std 802.11z: IEEE Standard for Information Technology—Amendment 7: Extensions to Direct-Link Setup", IEEE Computer Society 3 Park Avenue New York, NY 10016-5997, Oct. 14, 2010, 96 pages.
"IN Application No. 1177/MUM/2009 First Examiner Report", Sep. 11, 2014, 3 pages.
"Japanese Patent Application No. 2014-561078, Office Action", Sep. 15, 2015, 6 pages.
"PCT Application No. PCT/US11/62154 International Preliminary Report on Patentability", Jun. 20, 2013, 8 pages.
"PCT Application No. PCT/US2011/062154 International Search Report", Mar. 6, 2012, 13 pages.
"PCT Application No. PCT/US2013/029377 International Preliminary Report on Patentability", Jun. 5, 2014, 9 pages.
"PCT Application No. PCT/US2013/029377 International Search Report", Jun. 17, 2013, 11 pages.
"PCT Application No. PCT/US2013/029377 Written Opinion of the IPEA", Feb. 11, 2014, 7 pages.
"Peer-to-Peer Technical Group, Peer-to-Peer Technical Specification", Revision 1.0, May 12, 2009, 105 Pages.
"Republic of Korea Application No. 10-2014-7027929, Notice of Decision to Grant", Nov. 27, 2015, 4 pages.
"U.S. Appl. No. 12/492,405 Office Action", Mar. 15, 2012, 9 pages.
"U.S. Appl. No. 12/492,405 Office Action", Sep. 27, 2012, 10 pages.

(56) References Cited

OTHER PUBLICATIONS

"U.S. Appl. No. 12/562,819 Final Office Action", May 3, 2012, 32 pages.
"U.S. Appl. No. 12/562,819 Office Action", Nov. 14, 2011, 26 pages.
"U.S. Appl. No. 12/562,819 Office Action", Feb. 5, 2013, 29 pages.
"U.S. Appl. No. 12/705,267 Office Action", Mar. 22, 2012, 11 pages.
"U.S. Appl. No. 12/727,610 Final Office Action", Nov. 4, 2014, 18 pages.
"U.S. Appl. No. 12/727,610 Office Action", Dec. 5, 2013, 16 pages.
"U.S. Appl. No. 12/727,610 Final Office Action", Jan. 7, 2013, 24 pages.
"U.S. Appl. No. 12/727,610 Final Office Action", Jul. 7, 2014, 17 pages.
"U.S. Appl. No. 12/727,610 Office Action", Aug. 2, 2012, 20 pages.
"U.S. Appl. No. 12/768,434 Final Office Action", Mar. 20, 2013, 15 pages.
"U.S. Appl. No. 12/768,434 Office Action", Oct. 15, 2012, 11 Pages.
"U.S. Appl. No. 12/768,912 Final Office Action", Feb. 22, 2013, 27 Pages.
"U.S. Appl. No. 12/768,912 Office Action", Sep. 7, 2012, 23 pages.
"U.S. Appl. No. 12/963,160 Office Action", Jan. 6, 2014, 20 pages.
"U.S. Appl. No. 12/963,160 Office Action", Apr. 16, 2013, 25 pages.
"U.S. Appl. No. 12/963,160 Final Office Action", Jul. 30, 2014, 21 Pages.
"U.S. Appl. No. 12/963,160 Final Office Action", Aug. 15, 2013, 19 pages.
"U.S. Appl. No. 13/088,081 Non-Final Office Action", Apr. 24, 2013, 14 Pages.
"U.S. Appl. No. 13/413,011 Office Action", Jul. 30, 2014, 15 Pages.
"U.S. Appl. No. 13/955,779 Final Office Action", Aug. 31, 2015, 26 pages.
"U.S. Appl. No. 13/955,779 Office Action", May 13, 2015, 21 pages.
"U.S. Appl. No. 14/049,661 Office Action", Sep. 19, 2014, 11 Pages.
"Wireless LAN Medium Access Control (MAC) and Physical Layer (PHY) Specifications", IEEE Standard for Information Technology, Jun. 12, 2007, pp. 419-468.
Jung, et al., "A Power Control MAC Protocol for Ad Hoc Networks", 2002, 12 pages.
Co-Pending U.S. Appl. No. 12/727,610, filed Mar. 19, 2010, 42 pages.
Co-Pending U.S. Appl. No. 12/768,912, filed Apr. 28, 2010, 61 pages.

* cited by examiner

POWER SAVE MECHANISM FOR PEER-TO-PEER COMMUNICATION NETWORKS

RELATED APPLICATIONS

This application is a Continuation of and claims the priority benefit of U.S. application Ser. No. 13/413,011 filed Mar. 6, 2012.

BACKGROUND

Embodiments of the inventive subject matter generally relate to the field of communication systems and, more particularly, to a power save mechanism for the group owner in peer-to-peer networks.

Clients in a peer-to-peer (P2P) network can communicate with each other using direct data communication once they are associated with the peer-to-peer network. Direct data communication enables the clients to communicate without any intermediation by a group owner in the peer-to-peer network. Power savings can be achieved by the group owner in the peer-to-peer network using conventional mechanisms (e.g., Opportunistic Power Save mechanism and Notice of Absence (NoA) mechanism).

SUMMARY

Various embodiments for implementing a power save mechanism for a network coordinator device (e.g., group owner) of a peer-to-peer communication network are disclosed. In some embodiments, the network coordinator device determines whether all client devices associated with the peer-to-peer communication network support direct data communication. In response to determining all associated client devices support direct data communication, an awake mode is initiated and maintained for a predefined time period of a beacon interval. In response to detecting that a client request has not been fulfilled during maintenance of the awake mode, the awake mode is extended past the predefined time period for the network coordinator device to fulfill the client request.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to a power save unit of a group owner performing operations to implement a direct transfer power save mechanism, embodiments are not so limited. In some embodiments, additional components/modules of the group owner can perform operations to implement the direct transfer power save mechanism for the group owner in a peer-to-peer network. In other instances, well-known instruction instances, protocols, structures and techniques have not been shown in detail in order not to obfuscate the description.

In a peer-to-peer network, a group owner can achieve some power savings by implementing conventional power save mechanisms (e.g., Opportunistic Power Save mechanism and Notice of Absence Power Save mechanism). When employing the Opportunistic Power Save mechanism, a group owner in a peer-to-peer network enters a sleep mode (i.e. a low power utilization mode) when other devices in the peer-to-peer network are in the sleep mode. However, Opportunistic Power Save mechanism does not allow the group owner to initiate the sleep mode when other devices in the peer-to-peer network are in an awake mode. When employing the Notice of Absence Power Save mechanism, the group owner announces a period of unavailability and all devices in the peer-to-peer network enter the sleep mode for certain time intervals. However, with the Notice of Absence power save mechanism the group owner forces other devices in the peer-to-peer network to enter the sleep mode regardless of whether the sleep mode will interrupt data transfers between P2P clients.

In some embodiments, the group owner can implement a direct data transfer power save mechanism (hereinafter "direct transfer power save mechanism") to improve power savings for the group owner in the peer-to-peer network. The power save unit implements the direct transfer power save mechanism when associated clients (i.e., clients connected to the peer-to-peer network) support direct data communication. The direct transfer power save mechanism allows the group owner in the peer-to-peer network to enter the sleep mode when the associated clients are not utilizing the group owner for data transfer or performing other operations involving the group owner. The associated clients can directly exchange data using a direct path established using TDLS (Tunneled Direct link setup) protocol. The direct transfer power save mechanism achieves power savings for the group owner by allowing the group owner to enter the sleep mode even when the associated clients are in an awake mode (e.g., Constant Awake Mode) and performing data transfer operations (e.g., using direct data communication techniques). The direct transfer power save mechanism allows the group owner to enter the sleep mode irrespective of the mode (sleep or awake) of the associated clients. Also, the direct transfer power save mechanism does not force the associated clients into the sleep mode when the group owner enters the sleep mode.

Figure 1:
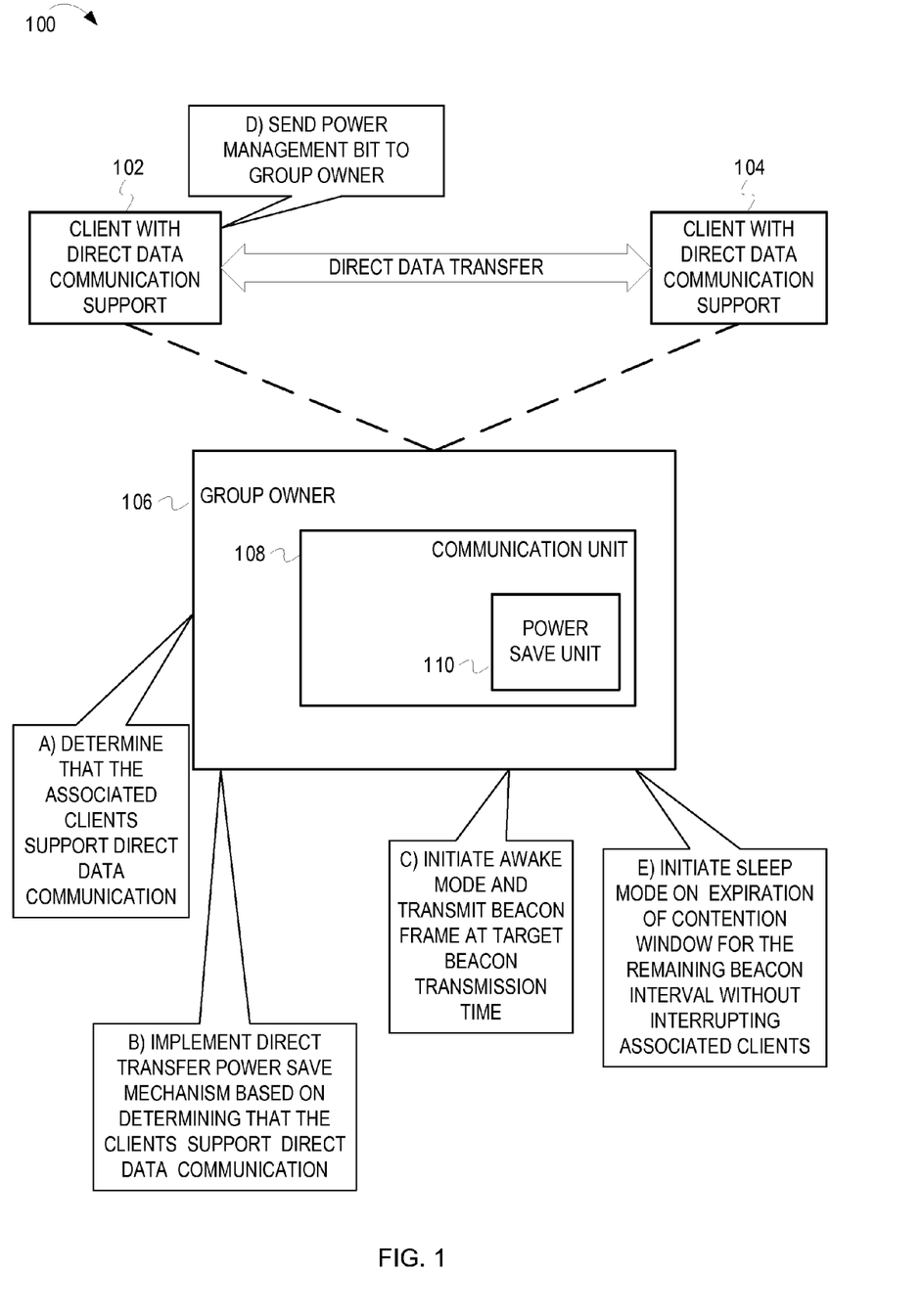
FIG. 1 depicts an example conceptual diagram for implementing a direct transfer power save mechanism in a peer-to-peer network.

FIG. 1 depicts an example conceptual diagram for implementing a direct transfer power save mechanism in a peer-to-peer network. FIG. 1 depicts a peer-to-peer network 100. The peer-to-peer network 100 comprises multiple entities including a client 102, a client 104 and a group owner 106. The clients 102 and 104 are connected to the peer-to-peer network 100. The clients 102 and 104 join the BSS (Basic Services Set) of the peer-to-peer network 100) via the group owner 106 through a series of handshake operations (e.g., authentication and association operations). The clients 102 and 104 are referred to as associated clients in the network 100. The client 102 and the client 104 feature support for direct data communication. By implementing direct data communication, the clients 102 and 104 can communicate with each other without the support of the group owner to exchange data. The client 102 and the client 104 can be any suitable computing device (e.g., laptop, tablet, mobile phone, etc.) with a wireless network interface and support for peer-to-peer network protocols. The clients 102 and 104 can connect to the Internet via the group owner 106 to communicate outside the peer-to-peer network. The group owner 106 includes a communication unit 108 and a power save unit 110. The group owner can be any suitable electronic device (e.g., router, laptop, tablet, mobile phone, desktop computer, gaming console, wireless access point, etc.) including wireless network communication interface, peer-to-peer network protocols, etc. that assumes ownership of the peer-to-peer network and is configured to operate as a network coordinator device for the peer-to-peer network. It is noted that in some instances a client device may assume ownership of the peer-to-peer network and operate as a group owner, and in other instances the client device may operate as one of the associated clients. The communication unit 108 comprises components for wireless communication capabilities including transmitter module(s), receiver module(s), processor module(s), program instructions, etc. to enable communication. The power save unit 110 may be implemented by the communication unit 108 using at least one or more of these components. FIG. 1 depicts example operations for implementing the direct transfer power save mechanism in a sequence of stages A through E. It is noted, however, that in some implementations some of the example operations described in stages A through E may be performed concurrently or in a different order.

At stage A, the group owner 106 determines that the associated clients support direct data communication in the peer-to-peer network 100. In one implementation, the power save unit 110 in the group owner verifies a set of conditions configured in the group owner 106 by the associated clients 102 and 104. For example, the power save unit 110 verifies whether a flag is set in the communication unit 108. The flag indicates whether a client is capable of direct data communication or not. The flag is configured in the communication unit 108 when the clients 102 and 104 join the peer-to-peer network 100. In some embodiments, the communication unit 108 maintains a data structure (e.g., array, table, etc.) with entries of the data structure corresponding to each of the clients associated with the peer-to-peer network. The communication unit 108 utilizes the data structure to store information about clients associated with the peer-to-peer network 100 e.g. MAC address of a client, RSSI, support for direct data communication, etc. The power save unit 110 reads the information stored in the data structure to verify whether a client supports direct data communication.

At stage B, the group owner 106 implements the direct transfer power save mechanism in response to determining the associated clients support direct data communication. For example, the power save unit 110 implements the direct transfer power save mechanism in the group owner 106 when all the associated clients support direct data communication. The power save unit 110 implements the direct transfer power save mechanism by modifying program settings within the power save unit 110 and/or by interacting with other modules in the communication unit 108. For example, the power save unit 110 can modify the value of a power save mode variable in the communication unit 108 to indicate the selection of the direct transfer power save mechanism. The power save unit 110 implements one of the conventional power save mechanisms when at least one of the associated clients in the peer-to-peer network 100 does not support direct data communication.

At stage C, the group owner 106 initiates an awake mode and transmits a beacon frame at target beacon transmission time. For example, the communication unit 108 initiates the awake mode and transmits a beacon frame at target beacon transmission time to announce the presence of a wireless peer-to-peer network. The beacon frame includes information about the peer-to-peer network (e.g., timestamp, Service Set ID, supported data rates, and/or communication mode, etc.). On detecting the beacon frame, a client (not currently associated with the peer-to-peer network 100) may request to join the peer-to-peer network 100. The client joins the peer-to-peer network 100 by registering with the group owner 106 through a series of handshake operations. The group owner 106 at least stores the information about communication capabilities of the client on completion of the handshake operations. The group owner 106 continues in the awake mode for a pre-defined contention window period. In some implementations, the duration of pre-defined contention window period depends on the channel access technique utilized for communication. In some implementations, the duration of the pre-defined contention window period may be configurable. In the awake mode, the group owner 106 performs handshake operations with new clients joining the peer-to-peer network 100 and fulfills any requests by the associated clients 102 and 104. In one example, the requests by the associated clients 102 and 104 may include communication with devices outside the peer-to-peer network 100, access to information outside the peer-to-peer network 100, etc. The power save unit 110 in the communication unit 108 determines whether the handshake operations with the new clients and requests by associated have been fulfilled within the contention window period. When the handshake operations are not completed or the requests by the associated clients 102 and 104 have not been fulfilled within the contention window period, the power save unit 110 extends the contention window period. In some implementations, the power save unit 110 continuously extends the contention window period until all the handshake operations and requests by the associated clients 102 and 104 have been fulfilled. In some embodiments, the power save unit 110 extends the contention window period up to a maximum limit (e.g., a maximum limit specified by the channel access technique or a configurable maximum limit). In other embodiments, the power save mechanism does not implement a maximum limit for extending the contention window period, with the exception of the start of the next beacon interval (i.e., when the beacon frame is sent). The power save unit 110 can extend the contention window period in accordance with the program settings configured in the power save unit 110. For example, the program settings of the power save unit 110 specify to increase the contention window period by a fixed time period or successively decreasing time periods for each extension of the contention window period in a particular beacon frame interval.

At stage D, the associated clients 102 and 104 send a power management bit to the group owner 106. For example, the associated clients 102 and 104 send a null data packet with the power management bit in response to detecting a beacon frame from the group owner 106. The power management bit indicates the mode of an associated client to the group owner 106. For example, the power management bit set to 0 indicates that an associated client is in the awake mode. The power management bit set to 1 indicates that an associated client is in the sleep mode. Although stage D is depicted after stage C, operations at stage D may happen in parallel with operations at stage C. The group 106 owner detects the data packet with power management bit during the awake mode.

At stage E, the group owner 106 initiates a sleep mode on expiration of the contention window period for the remaining beacon interval without interrupting the associated clients 102 and 104. For example, the power save unit 110 in the group owner 106 detects expiration of the contention window period and causes the communication unit 108 to enter the sleep mode. The power save unit 110 instructs the communication unit 108 to enter the sleep mode only when the associated clients detected during the contention period support direct data communications. During the sleep mode, components of the communication unit 108 operate in a low power mode. For example, during the sleep mode, the communication unit 108 turns off or reduces the power of the transmitter and receiver modules to operate in a low power mode. The group owner 106 initiates the sleep mode irrespective of the status of the associated clients 102 and 104. The group owner 106 continues in the sleep mode for the period of the beacon interval remaining after expiration of the contention window period. In other words, the group owner 106 remains in the sleep mode until the start of the next beacon interval (i.e., when the group owner 106 initiates the awake mode to transmit the next bacon frame of the next beacon interval). On completion of the beacon interval, the group owner 106 repeats operations depicted at stages C, D and E.

Figure 2:
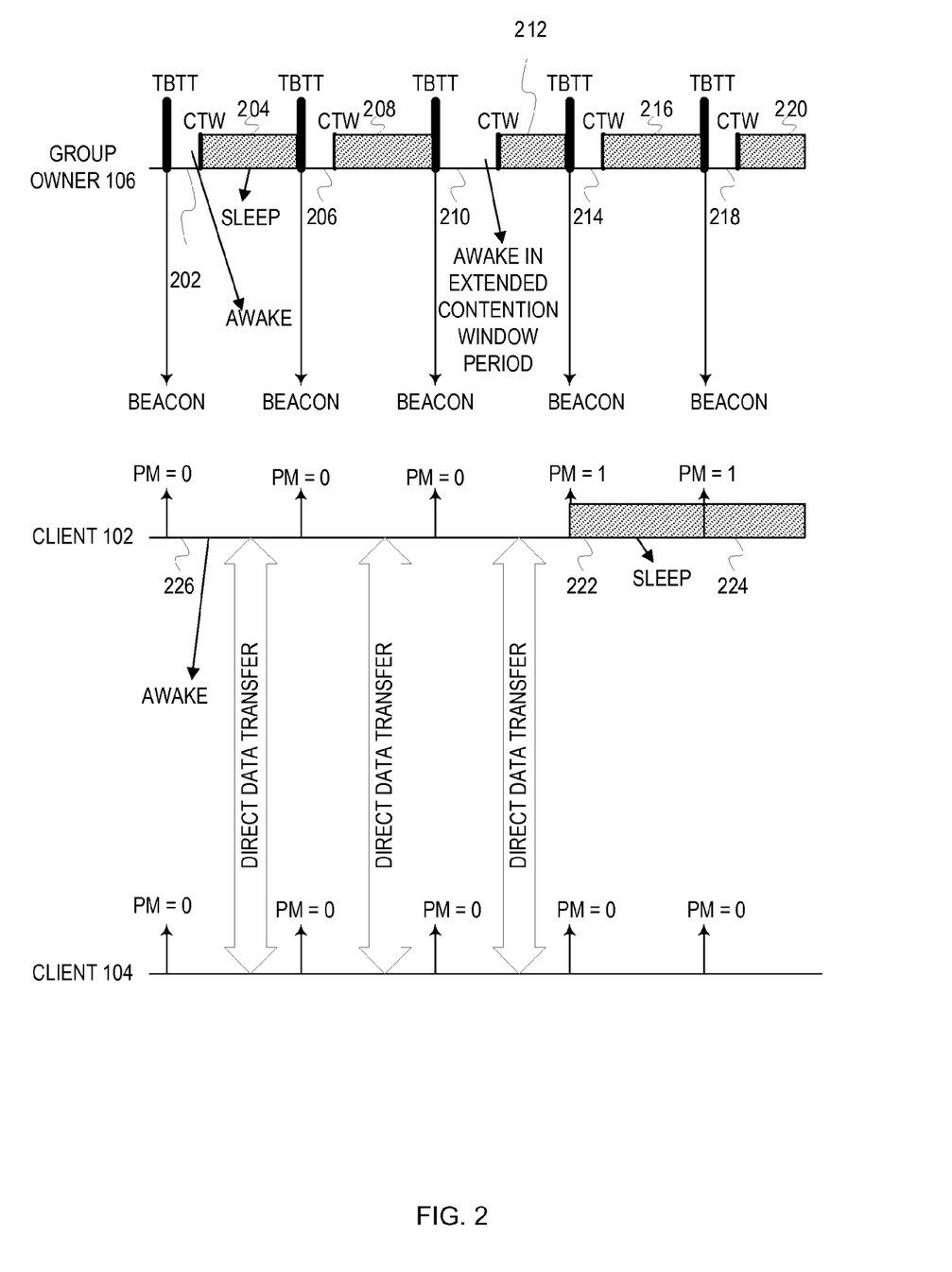
FIG. 2 depicts an example timing diagram for modes (sleep and awake) of entities in a peer-to-peer network with communication signals exchanged by the entities.

FIG. 2 depicts an example timing diagram for modes (sleep and awake) of entities in a peer-to-peer network with communication signals exchanged by the entities. The timing diagram includes a group owner 106 for the peer-to-peer network, a client 102 and a client 104. The clients 102 and 104 are the clients associated with the peer-to-peer network. FIG. 2 depicts time instances TBTT (Target Beacon Transmission Time) and CTW (Contention Window) for the group owner 106. In the depicted embodiment, the time interval between TBTT and CTW comprises a contention window period. The group owner 106 stays in the awake mode during the contention window period. The group owner 106 transmits a beacon frame at every TBTT. The beacon frame includes information about the peer-to-peer network (e.g., timestamp, Service Set ID, supported data rates, communication mode, etc.). The time interval between consecutive TBTT's comprises a beacon interval. In some implementations, for every beacon interval, the group owner 106 receives a PM (Power Management) bit from the associated clients 102 and 104. The PM bit indicates the mode of an associated client to the group owner 106. A value of 1 for the PM bit indicates the associated client is in the sleep mode. A value of 0 for the PM bit indicates the associated client is in the awake mode. FIG. 2 also depicts direct data transfer between the associated clients 102 and 104 when the clients 102 and 104 are in the awake mode.

The time periods 204, 208, 212, 216, 220 depict the time periods for the sleep mode of the group owner 106. The time periods 202, 206, 210, 214 and 218 depict contention window periods when the group owner 106 is in the awake mode. The group owner 106 completes handshake operations for new clients joining the peer-to-peer network during the contention window period. The group owner 106 also fulfills requests made by the associated clients 102 and 104 during the contention window period. When the handshake operations are not completed or the requests by the associated clients 102 and 104 have not been fulfilled within the contention window period, the group owner 106 extends the contention window period. The time period 210 depicts an extended contention window period and the group owner 106 stays in the awake mode for the extended contention window period. The time periods 222 and 224 depict the beacon intervals when the associated client 102 is in the sleep mode. The associated clients 102 and 104 transmit the Power Management bit as 1 on entering the sleep mode. The associated clients 102 and 104 transmit the Power Management bit as 0 when the associated clients 102 and 104 are in the awake mode. The time period 226 depicts the beacon interval when the associated client 102 is in the awake mode. For simplification, all time periods for the awake mode of the associated clients 102 and 104 are not depicted in FIG. 2.

Figure 3:
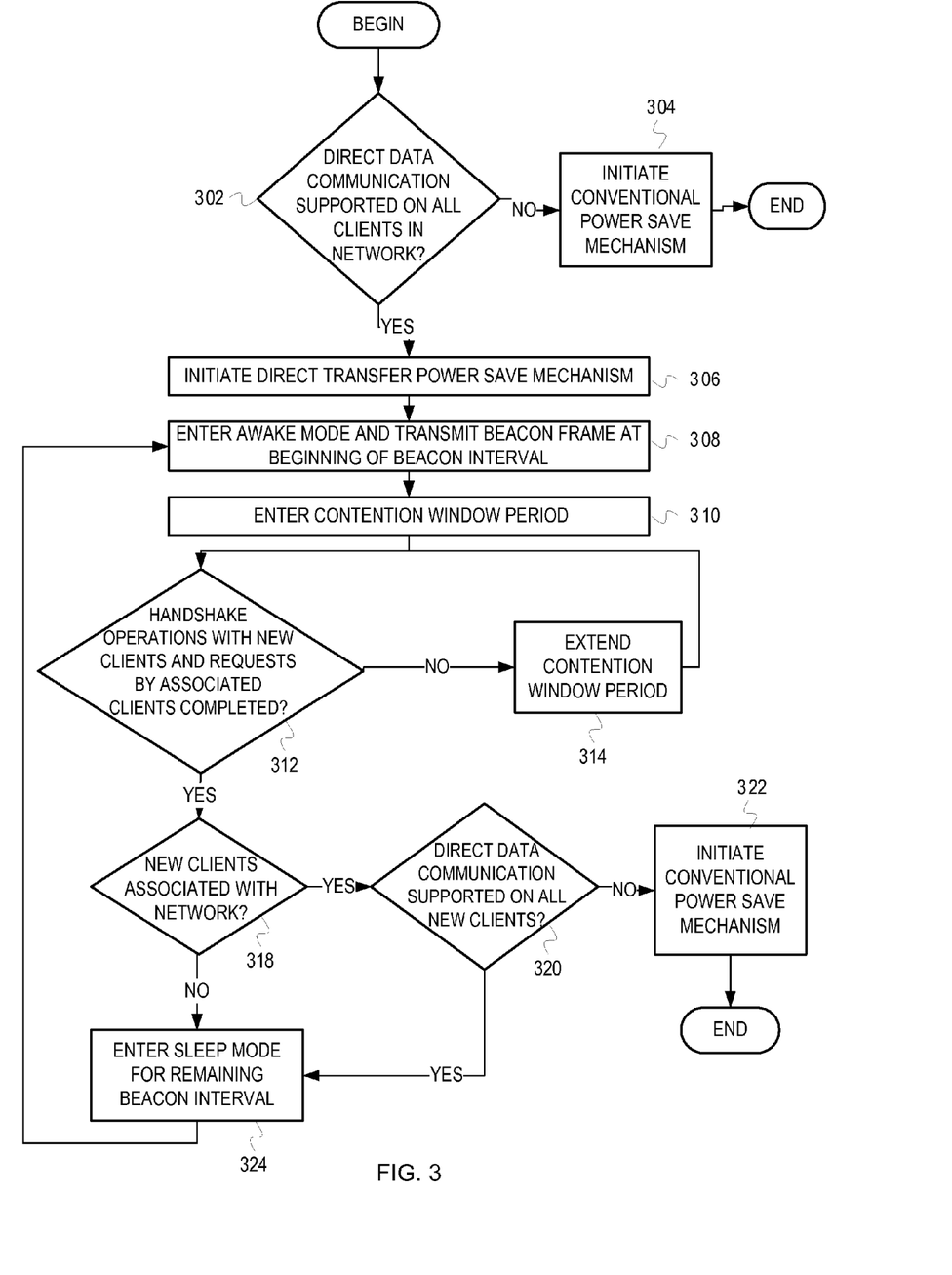
FIG. 3 illustrates a flow diagram of example operations to implement a direct transfer power save mechanism for a group owner in a peer-to-peer network.

FIG. 3 illustrates a flow diagram of example operations to implement a direct transfer power save mechanism for a group owner in a peer-to-peer network.

At block 302, it is determined whether direct data communication is supported on all clients in a peer-to-peer network. In some implementations, the power save unit of the group owner determines whether direct data communication is supported on all clients in a peer-to-peer network. For example, the power save unit verifies whether a flag (or other indicator) for direct data communication is set in a communication unit for each the clients associated with the peer-to-peer network. If the flag is set for each of the clients associated with the peer-to-peer network, control flows to block 306. If the flag is not set for at least one of the clients associated with the peer-to-peer network, control flows to block 304. The power save unit can verify the flag for one or more of the associated clients at a time. When the power save unit detects a first flag that is not set for one of the associated clients, the power save unit may skip checking the flags of the remaining associated clients and the control flows to block 304.

At block 304, in response to determining that at least one associated client does not support direct data communication, a conventional power save mechanism is initiated. In some implementations, the power save unit starts a conventional power save mechanism for the group owner (e.g., Opportunistic power save mechanism, Notice of Absence power save mechanism, etc.). For example, the power save unit executes a set of program instructions within the power save unit to start a conventional power save mechanism. In some embodiments, the power save unit instructs one of the modules in the communication unit to start a conventional power save mechanism.

At block 306, in response to determining that all the associated clients support direct data communication, a direct transfer power save mechanism is initiated. In some implementations, the power save unit initiates the direct transfer power save mechanism for the group owner. For example, the power save unit initiates the direct transfer power save mechanism by modifying the value of a power save identifier variable in the communication unit. The power save unit and the communication unit periodically monitor the power save identifier variable. In some embodiments, the power save identifier variable may be maintained by the power save unit. In some embodiments, the power save unit may set a flag in the communication unit to indicate that the direct transfer power save mechanism is enabled instead of (or in addition to) modifying the value of a variable.

At block 308, an awake mode is started and a beacon frame is transmitted at the beginning of a beacon interval. In some implementations, the power save unit causes the communication unit to enter the awake mode at the beginning of the beacon interval when the beacon frame is to be transmitted (e.g., at target beacon transmission time). For example, the power save unit instructs one or more modules of the communication unit to operate in the awake mode. When the communication unit enters the awake mode, the communication unit transmits the beacon frame (e.g., the transceiver of the communication unit transmits the beacon frame via the network interface and the antenna of the group owner). In some embodiments, the power save unit defines policies for the communication unit to enter the awake mode and transmit a beacon frame. The power save unit defines the policies for the communication unit when the direct transfer power save mechanism is initiated (i.e., at block 306). The power save unit configures program instructions in the communication unit in accordance with the policies. The policies may also be pre-defined in the communication unit to be implemented when the communication unit is operating in the awake mode.

At block 310, a contention window period is started during the awake mode. In some implementations, the power save unit causes one or more modules (e.g., transmitter-receiver module) in the communication unit to stay in the awake mode for the contention window period. The contention window period begins at target beacon transmit time. The contention window period may be based on the channel access technique utilized for communication and/or may be configurable. In some embodiments, the power save unit defines policies for the communication unit to stay in the awake mode for the contention window period. The power save unit defines the policies for the communication unit when the direct transfer power save mechanism is initiated (i.e., at block 306). The power save unit configures program instructions in the communication unit in accordance with the policies.

At block 312, it is determined whether handshake operations with new clients and requests by associated clients have been completed. In some implementations, the power save unit determines whether handshake operations with new clients and requests by associated clients have been completed. For example, the power save unit monitors a process queue for the group owner to determine if the handshake operations and the requests have been completed. The process queue comprises of handshake operations with new clients joining the network and requests by any of the associated clients. If the handshake operations and the requests have been completed, control flows to block 318. If the handshake operations and the requests have not been completed, control flows to block 314.

At block 314, in response to determining that the handshake operations with new clients and the requests by associated clients have not been completed, the contention window period is extended. In some implementations, the power save unit instructs one or more modules (e.g., transmitter-receiver module) in the communication unit to stay in the awake mode for the extended contention window period. The power save unit extends the contention window period in accordance with pending requests in the process queue of the group owner. For example, the power save unit may extend the contention window period by 150 micro seconds when one request is pending in the process queue. Similarly, the power save unit may extend the contention window period by 450 micro seconds when three requests are pending in the process queue. In some embodiments, the power save unit extends the contention window period in accordance with the type of requests in the process queue. For example, for a handshake operation the power save unit extends the contention window period by 150 micro seconds and for a request by an associated client the power save unit extends the contention window period by 100 micro seconds. Although examples refer to specific time intervals for contention window period, the time intervals can be configured by the power save unit. From block 314, control loops back to block 312 to determine whether the handshake operations and the requests by associated clients have been completed.

At block 318, in response to determining that the handshake operations with new clients and the requests by associated clients have been completed, it is determined whether new clients have associated with the peer-to-peer network. In some implementations, the power save unit determines association of new clients with the peer-to-peer network. For example, the power save unit verifies association of new clients when handshake operations for new clients in the process queue of the group owner are complete. If new clients have associated with the peer-to-peer network, control flows to block 320. If no new clients have associated with the peer-to-peer network, control flows to block 324.

At block 320, in response to determining that new clients have associated with the network, it is determined whether direct data communication is supported on all the new clients that have associated with the peer-to-peer network. In some implementations, the power save unit verifies whether direct data communication is supported on all the new clients. For example, the power save unit verifies if the flag for direct data communication is set in the communication unit for each of the new clients that have associated with the peer-to-peer network in the current beacon interval. If direct data communication is supported on all the new clients, control flows to block 324. If direct data communication is not supported on at least one of the new clients, control flows to block 322.

At block 322, in response to determining that direct data communication is not supported on at least one of the new clients a conventional power save mechanism is initiated. In some implementations, the power save unit initiates a conventional power save mechanism for the group owner (e.g., Opportunistic power save mechanism, Notice of Absence power save mechanism, etc.). For example, the power save unit executes a set of program instructions within the power save unit to initiate a conventional power save mechanism. In some embodiments, the power save unit instructs one of the modules in the communication unit to start a conventional power save mechanism. The power save unit may or may not specify the conventional power mechanism to be initiated by the module.

At block 324, a sleep mode is started for the remaining beacon interval. In some implementations the power save unit starts the sleep mode for the remaining beacon interval. For example, the power save unit causes one or more modules of the communication unit to operate in a low power mode for the remaining beacon interval. The power save unit starts the sleep mode independent of the mode of associated clients. The power save unit also does not force any of the associated clients into the sleep mode. The power save unit does not interrupt any on-going direct data communication between the clients. The control then loops back to block 308 and operations at blocks 308, 310, 312, 314, 318, 320, 322 and 324 are repeated for the next beacon interval.

It should be understood that the depicted diagrams (FIGS. 1-3) are examples meant to aid in understanding embodiments and should not be used to limit embodiments or limit scope of the claims. Embodiments may perform additional operations, fewer operations, operations in a different order, operations in parallel, and some operations differently. For example, the power save unit can determine whether new clients joining the peer-to-peer network support direct data communication during the handshake operations of new clients with the group owner. The power save unit may not wait to determine whether direct data communication is supported on the new clients until all the handshake operations have been completed.

In some embodiments, the power save unit can perform the operations of block 302 periodically. For example, when the group owner is not utilizing the direct transfer power save mechanism, at certain time intervals the power save unit determines if all the clients associated with the peer-to-peer network support direct data communication.

In some embodiments, the power save unit is not limited to entering the sleep mode until all the handshake operations for new clients and requests by associated clients have been completed. For example, if the contention window period is extended to comprise a significant portion of the beacon interval, the power save unit stops extending the contention window period and enters the sleep mode. In one specific example, if the contention window period is extended to comprise a predefined percentage of the beacon interval or is extended by a predefined time limit, the power save unit stops extending the contention window period and enters the sleep mode. In this example, the pending handshake operations and requests by the associated clients may be completed in the next beacon interval.

In some embodiments, the group owner transmits a broadcast message to all the associated clients on initiating the sleep mode to inform the associated devices that the group owner will be in the sleep mode. For example, the group owner can broadcast a null data packet with one of the bits set (e.g., a power management bit set) to indicate that the group owner is in the sleep mode for the remaining beacon interval. It is noted, however, that in other implementations the group owner may send other types messages with other types of indicators to indicate that the group owner is entering the sleep mode.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions (e.g., executable by one or more processors). A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
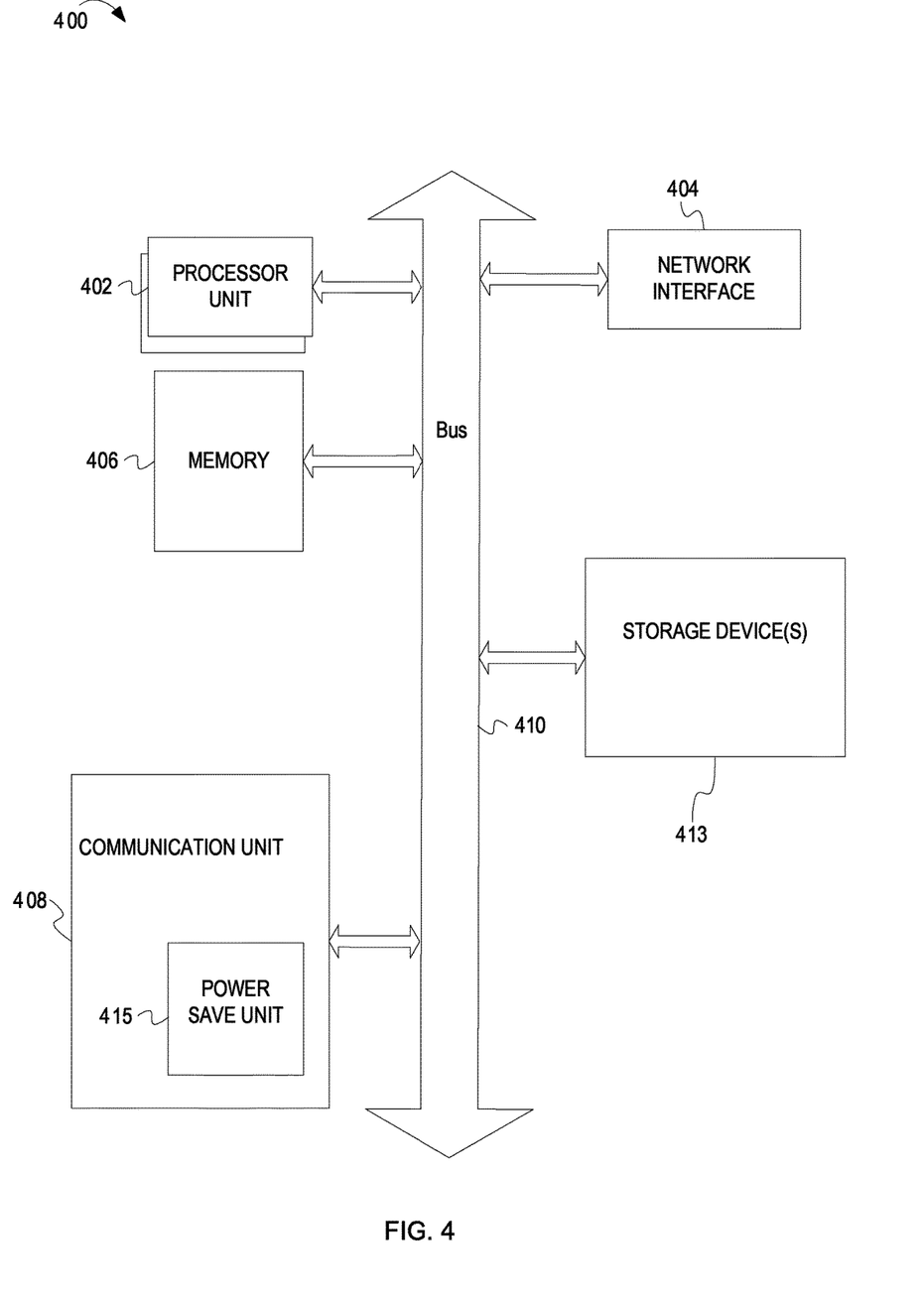
FIG. 4 is a block diagram of one embodiment of an electronic device including a communication unit configured to implement a direct transfer power save mechanism.

FIG. 4 is a block diagram of one embodiment of an electronic device 400 including a communication unit configured to implement a direct transfer power save mechanism. The electronic device 400 may be a wireless router, a laptop, a mobile device, a printer, or other suitable electronic device that is configured to operate as a network coordinator device (e.g., group owner) for a peer-to-peer network. The electronic device 400 includes a processor unit 402 (possibly including multiple processors, multiple cores, multiple nodes, and/or implementing multi-threading, etc.). The electronic device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 400 also includes a bus 410 (e.g., PCI, ISA, PCI-Express, HyperTransport®, InfiniBand®, NuBus, AHB, AXI, etc.), and network interfaces 404 that include at least one of a wireless network interface (e.g., a WLAN interface, a Bluetooth® interface, a WiMAX interface, a ZigBee® interface, a Wireless USB interface, etc.) and may also include a wired network interface (e.g., an Ethernet interface). The electronic device 400 also includes a communication unit 408, a power save unit 415 and a storage device(s) 413 (e.g., optical storage, magnetic storage, etc.). The communication unit 408 can be a system on chip (SoC) including a wireless transmitter-receiver (transceiver) unit, processor unit(s), memory unit(s), a power management circuit(s), program instructions, etc. to enable wireless communications. The power save unit 415 may be embodied in the communication unit 408 using at least one or more of these components and is configured to determine whether associated clients in a peer-to-peer network support direct data communication and implement a direct transfer power save mechanism. It is noted, however, that in other implementations some or all of the functionality of the power save unit may be embodied in the memory unit 406 or the storage device(s) 413 or separately coupled with to the bus 410. Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, the storage device(s) 413, the communication unit 408 and the network interfaces 404 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, techniques for implementing the direct transfer power save mechanism for a group owner in a peer-to-peer network may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a network coordinator device of a peer-to-peer communication network, whether all of a subset of client devices associated with the peer-to-peer communication network support direct data communication; and
   in response to determining that all of the subset of client devices support direct data communication,
      initiating an awake mode at the network coordinator device at a start time of a beacon interval associated with the network coordinator device, wherein the network coordinator device is to be awake for a predefined time period of the beacon interval, and
      in response to detecting that a client request has not been fulfilled during the predefined time period, persisting the network coordinator device as awake past the predefined time period.

2. The method of claim 1, wherein the network coordinator device is a group owner of the peer-to-peer communication network.

3. The method of claim 1, further comprising:
   placing the network coordinator device in a sleep mode after the predefined time period and persisting the network coordinator device in the sleep mode until completion of the beacon interval when a client device is in awake mode.

4. The method of claim 1, wherein a time period for persisting the network coordinator device as awake is based, at least in part, on a type of the client request.

5. The method of claim 1, wherein a time period for persisting the network coordinator device as awake is based, at least in part, on a number of pending client requests.

6. The method of claim 1, further comprising placing the network coordinator device to sleep in response to determining the client request has been fulfilled.

7. The method of claim 1, further comprising, in response to completing handshake operations with a new client device and determining the new client device has connected to the peer-to-peer communication network via the network coordinator device, determining whether the new client device supports direct data communication.

8. The method of claim 7, wherein, in response to determining that the new client device does not support direct data communication, implementing a conventional power save mechanism at the network coordinator device.

9. The method of claim 1, wherein the client request comprises a request by a new client device to join the peer-to-peer communication network.

10. The method of claim 1, wherein, in response to determining at least one of the subset of client devices does not support direct data communication, implementing a conventional power save mechanism at the network coordinator device.

11. A network coordinator device comprising:
   a processor; and
   a memory coupled with the processor, the memory having stored thereon executable instructions that, when executed by the processor, cause the network coordinator device to:
      determine whether all of a subset of client devices associated with a peer-to-peer communication network support direct data communication;
      in response to a determination that all of the subset of client devices support direct data communication,
         initiate an awake mode at the network coordinator device at a start time of a beacon interval associated with the network coordinator device, wherein the network coordinator device is to be awake for a predefined time period of the beacon interval,
         detect that a client request has not been fulfilled during maintenance of the awake mode, and
         persist the network coordinator device as awake past the predefined time period in response to detection that the client request has not been fulfilled.

12. The network coordinator device of claim 11, wherein the network coordinator device is a group owner of a peer-to-peer communication network.

13. The network coordinator device of claim 11, wherein the instructions further include instructions to cause the network coordinator device to:
   place the network coordinator device in a sleep mode after the predefined time period and persist the network coordinator device in the sleep mode until completion of the beacon interval when a client device is in awake mode.

14. The network coordinator device of claim 11, wherein a time period to persist the network coordinator device as awake is based, at least in part, on a type of the client request.

15. The network coordinator device of claim 11, wherein a time period to persist the network coordinator device as awake is based, at least in part, on a number of pending client requests.

16. The network coordinator device of claim 11, wherein the instructions further comprise instructions to place the network coordinator device to sleep in response to a determination that the client request has been fulfilled.

17. The network coordinator device of claim 11, wherein the instructions further cause the network coordinator device to determine whether a new client device supports direct data communication, in response to completion of handshake operations with the new client device and a determination that the new client device has connected to the peer-to-peer communication network.

18. The network coordinator device of claim 17, wherein the instructions further cause the network coordinator device to implement a conventional power save mechanism at the network coordinator device in response to a determination that the new client device does not support direct data communication.

19. The network coordinator device of claim 11, wherein the client request comprises a request by a new client device to join the peer-to-peer communication network.

20. The network coordinator device of claim 11, wherein the instructions further cause the network coordinator device to implement a conventional power save mechanism at the network coordinator device in response to a determination that at least one of the subset of client devices does not support direct data communication.

21. A non-transitory machine-readable medium having instructions stored therein that, when executed by one or more processors, cause a network coordinator device to perform operations that comprise:
 determining whether all of a subset of client devices associated with a peer-to-peer communication network support direct data communication; and
 in response to determining that all of the subset of client devices support direct data communication,
  initiating an awake mode at the network coordinator device at a start time of a beacon interval associated with the network coordinator device is to be awake for a predefined time period of the beacon interval, and
  in response to detecting that a client request has not been fulfilled during the predefined time period, persisting the network coordinator device as awake past the predefined time period.

22. The non-transitory machine-readable medium of claim 21, wherein the network coordinator device is a group owner of the peer-to-peer communication network.

23. The non-transitory machine-readable medium of claim 21, wherein the operations further comprise:
 placing the network coordinator device in a sleep mode after the predefined time period and persisting the network coordinator device in the sleep mode until completion of the beacon interval when a client device is in awake mode.

24. The non-transitory machine-readable medium of claim 21, wherein a time period for persisting the network coordinator device as awake is based, at least in part, on a type of the client request.

25. The non-transitory machine-readable medium of claim 21, wherein a time period for persisting the network coordinator device as awake is based, at least in part, on a number of pending client requests.

26. The non-transitory machine-readable medium of claim 21, wherein the operations further comprise placing the network coordinator device to sleep in response to determining the client request has been fulfilled.

27. The non-transitory machine-readable medium of claim 21, wherein the operations further comprise, in response to completing handshake operations with a new client device and determining the new client device has connected to the peer-to-peer communication network via the network coordinator device, determining whether the new client device supports direct data communication.

28. The non-transitory machine-readable medium of claim 27, wherein the operations further comprise, in response to determining that the new client device does not support direct data communication, implementing a conventional power save mechanism at the network coordinator device.

29. The non-transitory machine-readable medium of claim 21, wherein the client request comprises a request by a new client device to join the peer-to-peer communication network.

30. The non-transitory machine-readable medium of claim 21, wherein the instructions further comprise:
 in response to determining at least one of the subset of client devices does not support direct data communication, implementing a conventional power save mechanism at the network coordinator device.

* * * * *